(12) United States Patent
Sands (10) Patent No.: US 8,985,843 B2
(45) Date of Patent: Mar. 24, 2015

(54) SYSTEM AND METHOD FOR ENHANCED PREPARATION AND STORAGE OF HOMEMADE BABY FOOD

(75) Inventor: Lenny Sands, Los Angeles, CA (US)

(73) Assignee: Baby Bullet, LLC, Los Angeles, CA (US)

( * ) Notice: Subject to any disclaimer, the term of this patent is extended or adjusted under 35 U.S.C. 154(b) by 570 days.

(21) Appl. No.: 13/284,882

(22) Filed: Oct. 29, 2011

(65) Prior Publication Data

US 2012/0107469 A1  May 3, 2012

Related U.S. Application Data

(60) Provisional application No. 61/408,506, filed on Oct. 29, 2010.

(51) Int. Cl.
A47J 43/04 (2006.01)
A47J 43/046 (2006.01)
A47J 43/06 (2006.01)
A47J 43/07 (2006.01)
A23L 1/29 (2006.01)

(52) U.S. Cl.
CPC .............. *A23L 1/296* (2013.01); *A47J 43/046* (2013.01); *A47J 43/07* (2013.01); *A47J 43/0727* (2013.01); *A47J 43/0716* (2013.01); *A47J 2043/0738* (2013.01)
USPC ............................ 366/197; 366/199; 366/205

(58) Field of Classification Search
CPC ..... A47J 43/046; A47J 43/0716; A47J 43/27; A47J 43/04
USPC ................. 206/219, 459.1, 576; 241/98, 100; 99/485; 366/205, 206
See application file for complete search history.

(56) References Cited

U.S. PATENT DOCUMENTS

| | | | | | |
|---|---|---|---|---|---|
| 153,529 | A | * | 7/1874 | Bennett | 215/230 |
| 261,131 | A | * | 7/1882 | Bonshire | 116/309 |
| 2,096,825 | A | * | 10/1937 | Roman | 426/114 |
| 2,767,680 | A | * | 10/1956 | Lermer | 116/308 |
| 2,981,039 | A | * | 4/1961 | Pohl | 53/457 |
| 3,064,949 | A | * | 11/1962 | Dewenter | 241/195 |
| 3,187,366 | A | * | 6/1965 | Fant | 366/197 |
| 3,240,610 | A | * | 3/1966 | Cease | 426/113 |
| 3,390,677 | A | * | 7/1968 | Razimbaud | 604/414 |
| 3,390,766 | A | * | 7/1968 | Stockdale | 206/427 |
| 3,417,972 | A | * | 12/1968 | Vincent | 241/199.12 |
| 3,756,429 | A | * | 9/1973 | Fleischer et al. | 206/504 |
| 3,818,858 | A | * | 6/1974 | Kramer et al. | 116/308 |
| 3,949,876 | A | * | 4/1976 | Bridges et al. | 206/427 |
| 3,996,879 | A | * | 12/1976 | Walton | 116/308 |

(Continued)

*Primary Examiner* — Tony G Soohoo
(74) *Attorney, Agent, or Firm* — Trojan Law Offices (57) ABSTRACT

The present invention describes a system and method for easy, affordable, efficient, and convenient preparation and storage of fresh, high-quality homemade baby food. The system generally comprises a blender for processing fresh produce into baby food and multiple devices to store multiple portions of freshly produced baby food resulting from one use of the system. For example, one component of the system includes a storage cup having a freshness indicator and lid to immediately store the freshly made food in an organized and convenient manner. The method comprises steps of producing the baby food, transferring the food to an appropriate storage receptacle, adjusting an indicator on the storage receptacle to indicate the freshness level of the food, and immediately serving and covering the remaining receptacles to store the unused food.

12 Claims, 7 Drawing Sheets

(56) References Cited

U.S. PATENT DOCUMENTS

| | | | | |
|---|---|---|---|---|
| 4,225,052 A | * | 9/1980 | Tector et al. | 220/506 |
| 4,314,650 A | * | 2/1982 | Cillario | 220/23.83 |
| 4,487,509 A | * | 12/1984 | Boyce | 366/199 |
| 4,621,670 A | * | 11/1986 | Yuen | 220/801 |
| 4,694,961 A | * | 9/1987 | Menendez | 206/508 |
| 4,877,119 A | * | 10/1989 | Hosking | 206/459.1 |
| 5,335,814 A | * | 8/1994 | Hepp | 220/509 |
| 5,441,164 A | * | 8/1995 | Beck et al. | 220/575 |
| 5,644,298 A | * | 7/1997 | Brooks et al. | 340/612 |
| 5,662,224 A | | 9/1997 | Nogues | |
| 5,692,830 A | * | 12/1997 | Costanzo | 366/314 |
| 5,839,581 A | * | 11/1998 | Vagedes | 206/459.1 |
| 5,845,777 A | * | 12/1998 | Najmi | 206/459.1 |
| 6,376,803 B1 | * | 4/2002 | Klinger | 219/387 |
| 6,817,750 B1 | * | 11/2004 | Sands | 366/205 |
| 7,066,640 B2 | | 6/2006 | Sands | |
| 7,422,362 B2 | * | 9/2008 | Sands | 366/205 |
| 7,735,651 B2 | * | 6/2010 | Shew et al. | 206/541 |
| 2008/0138477 A1 | * | 6/2008 | Mular et al. | 426/392 |
| 2008/0314771 A1 | * | 12/2008 | Barbalho et al. | 206/203 |

* cited by examiner

SYSTEM AND METHOD FOR ENHANCED PREPARATION AND STORAGE OF HOMEMADE BABY FOOD

CROSS-REFERENCE TO RELATED APPLICATIONS

This non-provisional application claims priority to U.S. Provisional Application Ser. No. 61/408,506 filed on Oct. 29, 2010, which is hereby incorporated by reference in its entirety.

BACKGROUND OF THE INVENTION

1. Field of the Invention

This invention relates to a system and method for producing and storing freshly made baby food.

2. Description of Related Art

Fresh and organic baby foods are not readily available in supermarkets today, nor it is easy or convenient for one to prepare and store homemade baby foods. Store-bought jarred baby food is commonly considered a convenient way to feed a growing baby. However, the jarred food is overly processed compared to the fresh produce that it is made from. For example, typical jarred baby food can have a shelf life of up to three years because it has been heated to extremely high temperatures that can kill bacteria. This large amount of heat applied can also have a negative effect on the nutrition of the food. Jarred food can also contain fillers, preservatives, additives, sweeteners, and even a certain level of acceptable "non-food" ingredients such as bug parts, rodent hairs, and rodent droppings, among other things.

In addition, jarred food is more expensive than the amount of food that can be made from fresh produce. For example, jarred baby food can typically cost approximately one dollar per serving. On the other hand, one can produce, for example, approximately 10 servings of baby food from one organic sweet potato for the same price. One can also save time and money by making baby food at home rather than traveling to a grocery store.

An alternative to buying baby food in the supermarket is making it at home. However, there is no simple and convenient system or method available to do so. Current methods of producing homemade baby food are wasteful. One may create a large quantity of baby food using a blender or food processor but lack an organized system to store the food in a manner that indicates the freshness level of the food. As a result, excess food may be thrown away.

What is needed is a quick, more efficient, affordable, and convenient at-home system and method for producing and storing high quality, homemade blended foods. Also what is needed is a system that has an adjustable and reusable indicator to indicate the freshness level of the food. With these goals in mind, the inventor has created an easy-to-use and organized system and method for instantly making multiple days worth of fresh, homemade baby food having the aforementioned desired qualities.

BRIEF SUMMARY OF THE INVENTION

The present invention includes a system for enhancing preparation and storage of freshly homemade baby food. The system can include a blender base and a blender container having a removable blade adapter. The removable blade adapter has a blade member. The blender container and removable blade adapter are capable of operatively engaging with the blender base to thereby process food with the blade member when engaged. The blender container can further comprise at least one locking member to lock the blender container to the blender base and a lip extending around the perimeter of the blender container to prevent spills into the blender base.

The system can also include at least one storage cup capable of receiving the food processed by the blender. The storage cup can have a removable lid and an indicator that can indicate the date the food was prepared, the date to use the food by, or other desired indicium. In one embodiment, the indicator can comprise a rotatable element having an indicator window through which a reference indicium is visible.

The system can also include a cup storage tray having at least one receptacle. The receptacle is capable of holding a plurality of storage cups or blender containers. Another storage option of the system is a food storage tray having at least one cavity capable of receiving food processed by the blender. A storage tray cover can be provided to cover the food storage tray. A spatula may also be provided to transfer the processed food from the blender containers to other storage devices of the system.

The system can also include multiple removable lids and sipper tops adapted to connect to an open end of the blender containers or storage cups. When the closed ends of the blender container or storage cups is rounded, the storage devices can further comprise at least one protruding element to allow the device to stand upright on a flat surface. The blender containers and storage cups can further comprise handles to allow better handling when used as drinking vessels.

A method for enhanced preparation and storage of freshly produced food portions using the system is also described, generally comprising the following steps: processing food in the blender container; transferring the processed food to a storage cup or at least one cavity of said food storage tray; and covering the food storage device. When a storage cup or blender container having an indicator is used to store the food, a user can adjust the indicator to set the desired indicium. A user can easily pre-plan the preparation a known amount of food portions using the system and method.

DETAILED DESCRIPTION OF THE INVENTION

The detailed description set forth below in connection with the appended drawings is intended to provide example embodiments of the present invention and is not intended to represent the only forms in which the invention may be constructed or utilized. The description sets forth the functions and the sequences of steps for constructing and operating the invention. However, it is to be understood that the same or equivalent functions and sequences may be accomplished by different embodiments that are also intended to be encompassed within the spirit and scope of the invention.

Some embodiments of the invention will be described in detail with reference to FIGS. 1-16. Additional embodiments, features, and/or advantages of the invention will become apparent from the description or may be learned by practicing the invention. The drawings in the figures are not to scale and have like numerals referring to like features through both the drawings and the description.

The system for enhanced preparation and storage of home-processed food portions can include a blender base 10, at least one blender container 20 having a removable blade adapter 30 with a blade member 32, a storage cup 40 with a removable lid 50 and a freshness indicator 60, a cup storage tray 70, a food storage tray 80, a food storage tray cover 84, a removable lid 50 adapted to fit the blender container 20, and a spatula 110.

For the purposes of this invention, the term "blender" is generally defined as a device having whirling blades for chopping, mixing, blending, processing, or liquefying foods. Functionally, the blender base 10 has an electric motor 500 of the type generally known in the art to provide rotary motion to a blade 32 of the blade adapter 30 to process food in a blender container 20.

When the blender container 20 and removable blade adapter 30 are manufactured as one component or as separate components that are affixed with one another, the blade adapter 30 and blender container 20 can be operatively connected with the blender base 10 to process food in the blender container 20. The blade member 32 is positioned within the blender container 20 during operation of the blender portion (i.e. the blender base 10, the blender container 20, and the removable blade adapter 30) of the system.

Figure 7:
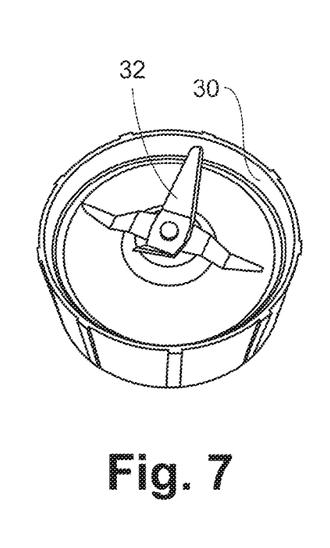
FIG. 7 is a top perspective view of an embodiment of a removable blade adapter in accordance with the present invention.

An open end 22 of the blender container 20 may be coupled to a removable blade adapter 30 incorporating a blade member 32 adapted to agitate the contents of the container 20. The blade member 32 is operatively coupled to an impeller 301 powered by a blender motor 500 of the type generally shown in FIG. 5. The blade member 32 can include one, two, three, four or more cutting elements, as needed. The cutting elements can be generally flat members with sharpened edges, pointed tips, and/or one or more bends along the surface of the cutting elements. Different blade 32 embodiments may be suited for different foods. For example, a flatter blade 32 may be utilized to mill grains to make cereals. A cross-blade 32 that can be comprised of the flatter blade and a raised blade, as shown in FIG. 7, can be utilized to puree and blend foods.

Figure 8:
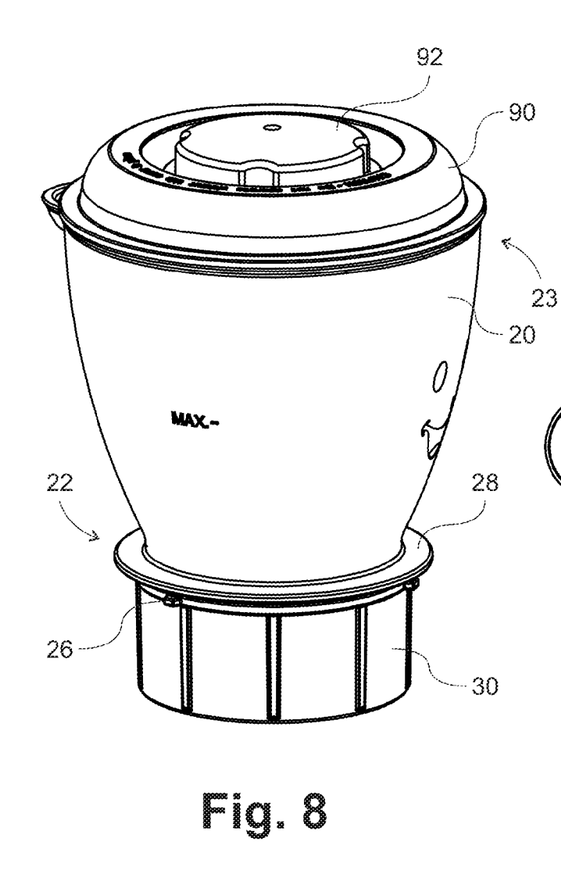
FIG. 8 is a perspective view of an embodiment of a blender container and removable blade adapter in accordance with the present invention.
Figure 9:
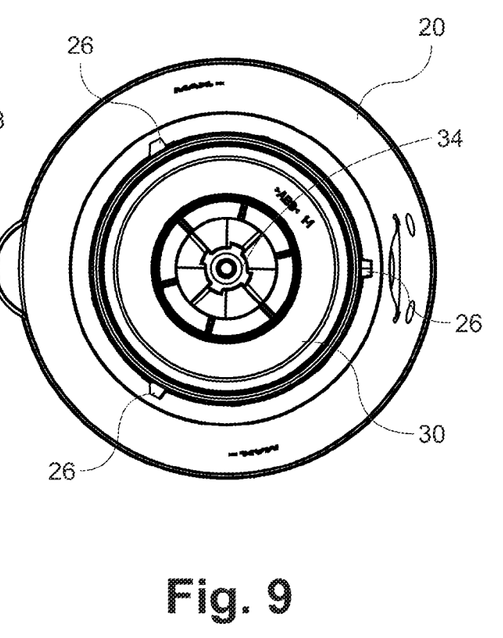
FIG. 9 is a bottom view of FIG. 8.
Figure 10:
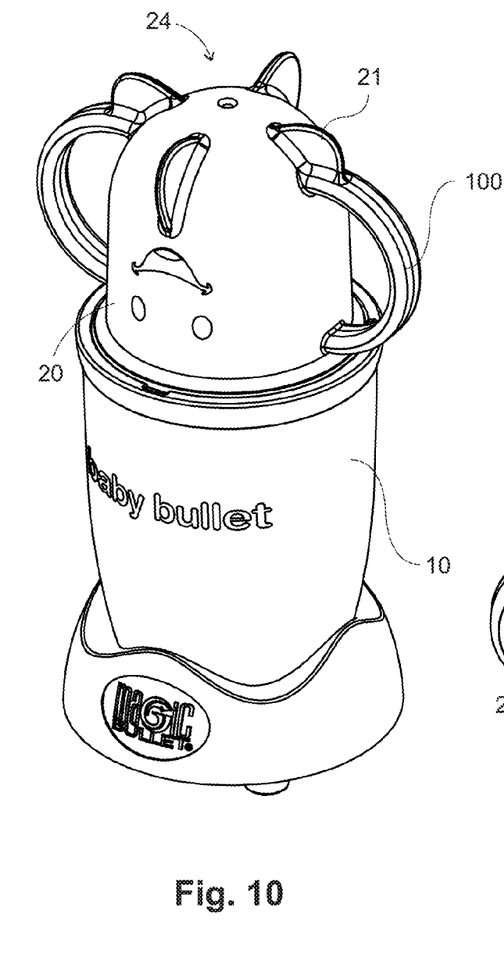
FIG. 10 is a perspective view of an embodiment of a blender container and blender base in accordance with the present invention.
Figure 11:
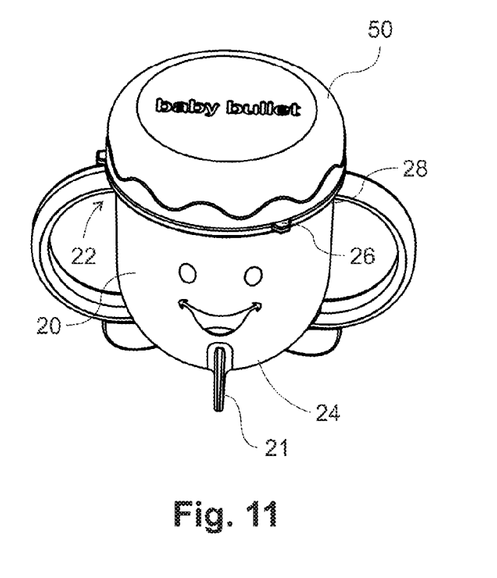
FIG. 11 is a perspective view of an embodiment of a blender container in accordance with the present invention.

The removable blade adapter 30 can be affixed to an open end 22 of the blender container 20 via a thread-fit, friction fit, snap-fit or any other suitable type of attachment. The open end 22 of the blender container 20 can also have at least one protruding locking member 26, as generally shown in FIGS. 8, 9, and 11. The locking members 26 are adapted to operatively lock blender container 20 to a blender base 10 of the type generally shown in FIGS. 2-4 and 10. The locking members 26 allow the user to operate the blender without requiring a constant application of force to container 20 (to keep the motor switched on). An open end 22 of the blender container 20 can also comprise a lip 28 that extends along the outer perimeter of the blender container 20. The lip 28 is at least flush or can extend beyond the perimeter of the top edge of the blender base 10 to prevent liquids or processed food from spilling into the blender base 10.

FIGS. 2 and 8-11 generally illustrate various configurations of a blender container 20 which may be adapted for small or large servings to be prepared/consumed by one and/or a few individuals. For example, FIGS. 10 and 11 generally show a blender container 20 having one open end 22 and one closed end 24. The container 20 can have one or more handles 100. The container 20 can be bullet-shaped and can include at least one protruding element 21, such as an external ridge generally shaped to permit the container 20 to rest on its apex without tipping over.

As shown in FIG. 11, the container 20 is resting on a plurality of protruding elements 21, allowing users convenient access to its interior. The number of protruding elements 21, such as fin protrusions or ridges, may be varied as needed so long as the container 20 can stand upright on a substantially flat surface. In the alternative, a closed end 24 of the blender container 20 can have a flat surface rather than bullet-shape to stand upright without the need for one or more external protruding elements 21.

Figure 17:
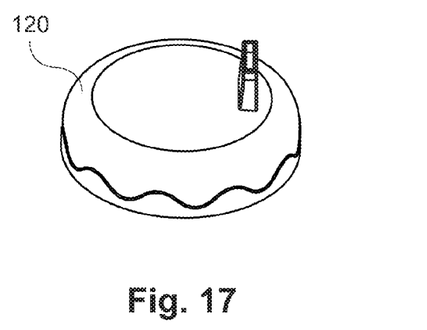
FIG. 17 is a perspective view of an embodiment of a sipper top in accordance with the present invention.

The embodiment shown in FIG. 11 is a mug-type drinking vessel 20. The mug 20 with a removable lid 50 provides another serving and storing option. The mug 20 can have two handles 100. A sipper top 120, depicted in FIG. 17, may be placed on top of the blender container 20 in place of a removable lid 50. A sipper top 120 may be used to prevent spills when children use the mug 20. The sipper top 120 can be affixed to an open end 22 of the container 20 via threads, a friction fit, snap-fit or other suitable type of attachment.

The user may blend the contents of the blender container 20 (FIG. 10), detach the container 20 from the blender base 10, access the contents of container 20 with the container 20 standing upright on a flat surface, and store the contents for later use using a removable lid 50 (FIG. 11). In such embodiments, the container 20 may be used as, besides a drinking vessel, an alternative storage cup 40. The removable lid 50 can be affixed to an open end 22 of the container 20 via threads, a friction fit, snap-fit or other suitable type of attachment. Once the removable lid 50 is affixed, the container 20 may be inverted to rest on the lid.

Figure 1:
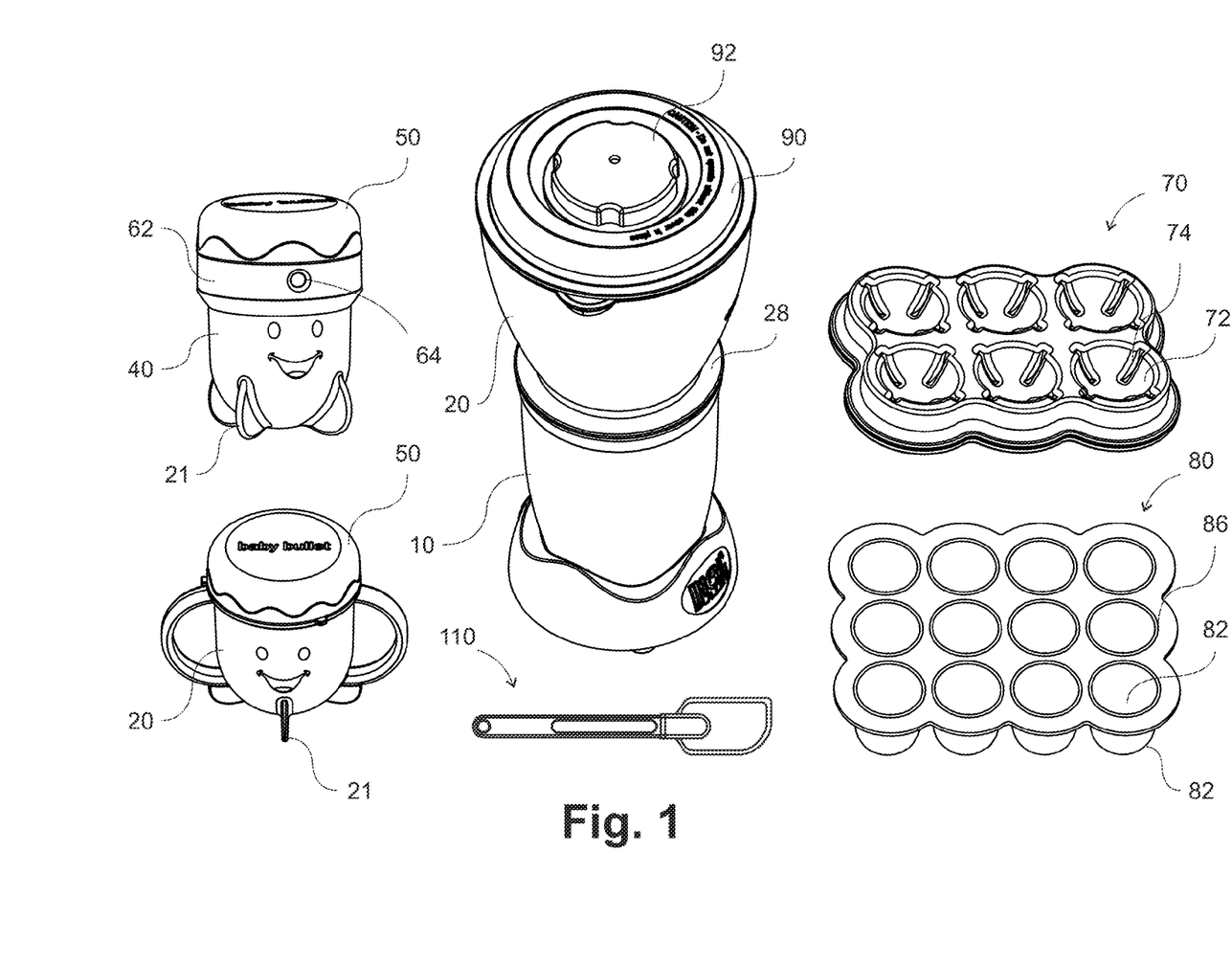
FIG. 1 is an embodiment of a system in accordance with the present invention.
Figure 2:
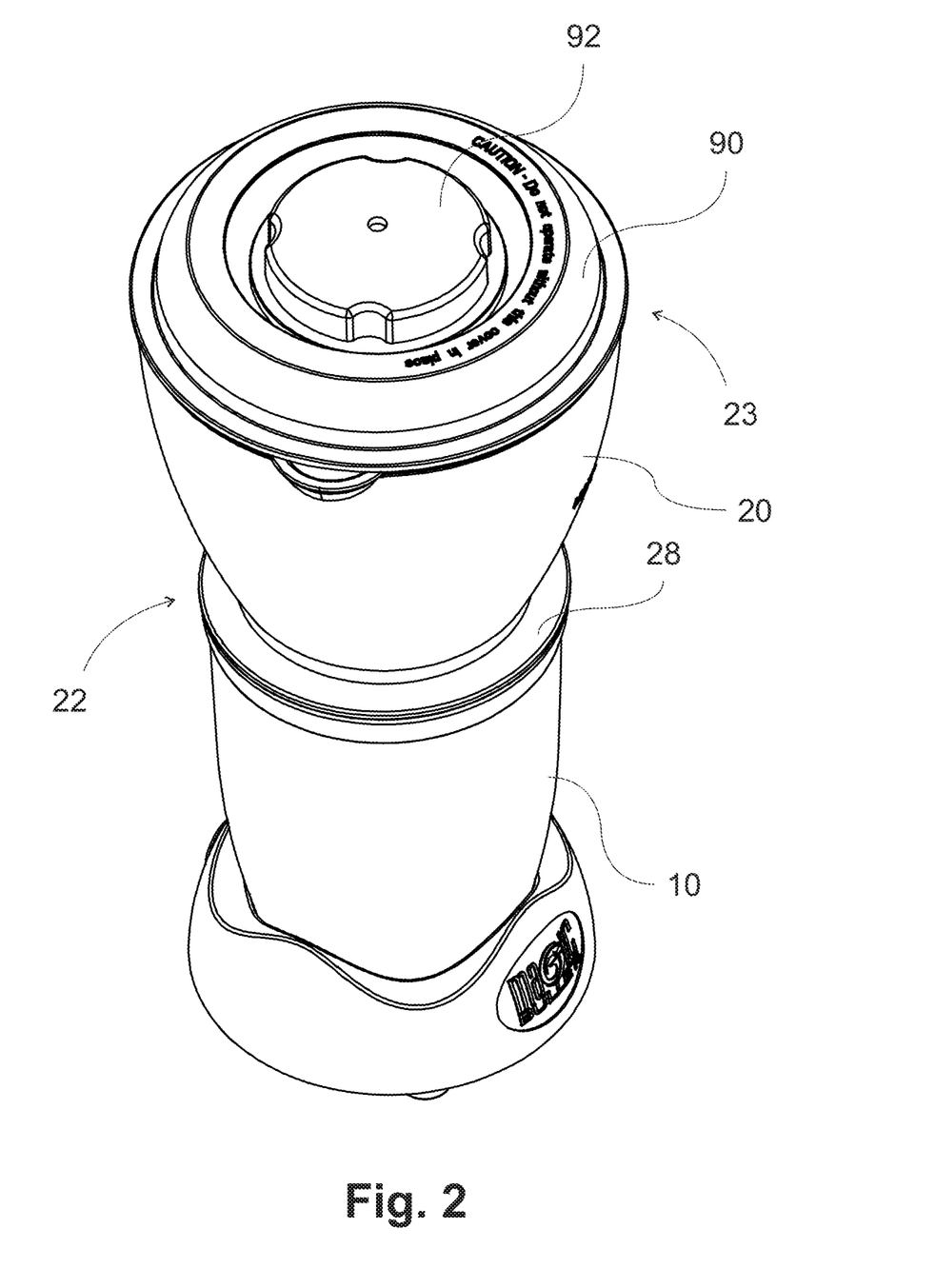
FIG. 2 is a perspective view of an embodiment of a blender container and blender base in accordance with the present invention.

Another embodiment of the blender container 20 is shown in FIGS. 2, 8, and 9. The blender container 20 can have two open ends, a first open end 22 and a second open end 23. One open end 22 of the blender container 20 is adapted to connect with a removable blade adapter 30 having a blade member 32, as described above. As shown in FIGS. 8-9, the open end 22 of the blender container 20 that is capable of connecting to the removable blade adapter 30 can be provided with one or more locking members 26. The locking members 26 can be spaced about the periphery of an open end of the container 20. The open end 22 of the blender container 20 that can affix with a blade adapter 30 can also comprise a lip 28 that extends along the outer perimeter of the blender container 20 to prevent liquids or processed food from spilling on to the blender base 10. The container 20 can include one or more handles 100.

The second open end 23 of the blender container 20 can attach to removable lid members 90, 92 (FIGS. 2 and 8). The lid member 90 may be partially open to provide access to the interior of blender container 20. A second lid member 92 may be coupled to the first lid member 90 to cut off access to the interior of the blender container 20. The lid member 90 may be locked on to the open top of the blender container 20 via a cap-locking member. The cap-locking member may be implemented, for example, as a generally L-shaped ridge disposed at the lip of an open end 23 of blender container 20. The cap-locking member can engage a corresponding locking member on lid member 90 to securely lock the same to blender container 20. Other suitable lid configurations may be utilized, as needed, such as a one-piece or a multi-piece lid cap and/or the like.

The blender containers 20 can be adapted to hold a small or relatively larger volume of food and liquids. Larger sized blender containers 20 allow a user to process multiple food portions with one use and transfer the food portions to storage cups 40 or a food storage tray 80 for storage.

Figure 3:
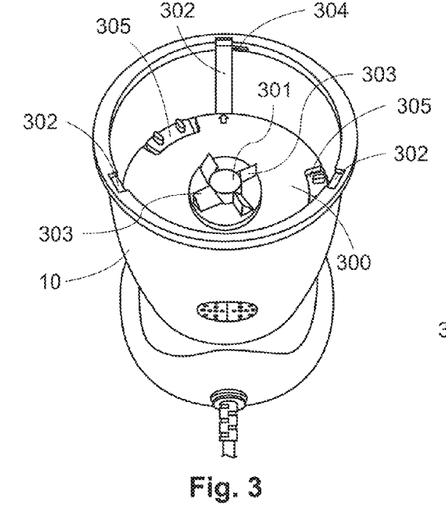
FIG. 3 is a perspective view of an embodiment of a blender base in accordance with the present invention.
Figure 4:
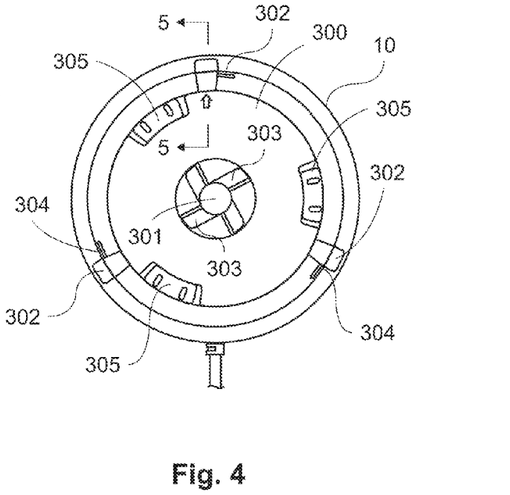
FIG. 4 is a top plan view of FIG. 3.

The blender base 10 includes a recessed well 300, as generally depicted in reference to FIGS. 3-4. The blender base 10 includes a motor 500 (FIG. 5) that is operatively coupled to an impeller 301 (FIG. 3). The impeller 301 can comprise a plurality of symmetrically disposed blades 303 radiating from the center of impeller 301. A plurality of bushings 305 (FIGS. 3-4) may be utilized about the periphery of recessed well 300. Alternatively, the blender base 10 may be adapted for use without utilization of bushings 305. The bushings 305 may be made from a generally resilient material such as, but not limited to, rubber, silicone or the like to reduce vibrations during agitation of the container's 20 contents.

The recessed well 300 is further provided with a plurality of pressure-activated switches 302 (FIGS. 3-4). The removable blade adapter 30 is adapted to fit within the recessed well 300 and couple operatively to the impeller 301. In use, the weight of the blender container 20 can cause the downward movement of the switches 302 thereby activating the motor 500. A user may also press the blender container 20 to cause downward movement of the switches to activate the motor 500. As generally shown in FIG. 3, a locking groove 304 can be provided adjacent to the switch 302. Accordingly, in use, when the locking members 26 (FIGS. 8-11) contact and depress the respective switches 302, the blender container 20 may be rotated by the user to allow the locking members 26 to engage the respective locking grooves 304.

Figure 5:
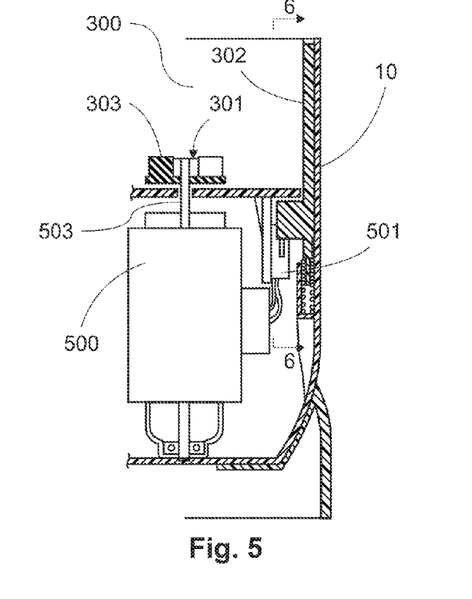
FIG. 5 is a cross-sectional view taken along section line 5-5 of FIG. 4.
Figure 6:
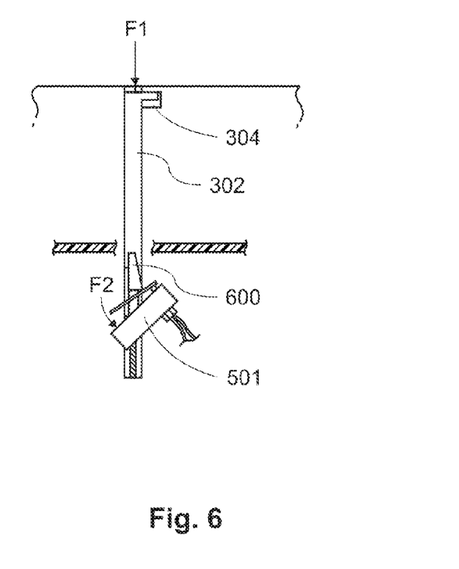
FIG. 6 is a cross-sectional view taken along section line 6-6 of FIG. 5.

As generally depicted in FIG. 6, when a force $F_1$ is applied to the switch 302, the switch 302 moves downward, i.e. in the direction of the applied force. This downward movement causes a cam 600 on the switch 302 to contact a motor power switch 501 thereby powering the blender motor 500 (FIG. 5). Accordingly, depending on the intended use or application, the blender container 20 may be depressed to activate the motor 500 (FIG. 5) for relatively short periods of time. For example, the user may want to pulse the blending action of the blender to create a thicker or chunkier consistency of food.

Alternatively, the blender container 20 may be depressed and rotated slightly to allow the at least one locking member 26 to engage the respective locking grooves 304, thereby permitting continuous operation of the motor 500, i.e. without requiring the user to exert constant pressure on the container 20 to keep the motor running. The user may want to utilize this option to create a thinner or finer consistency of food.

Figure 12:
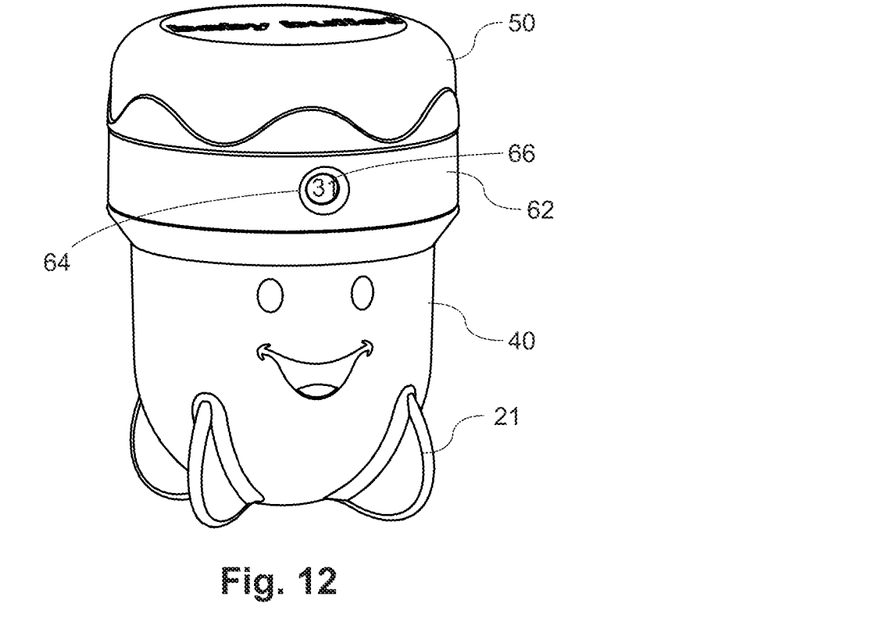
FIG. 12 is a perspective view of an embodiment of a storage cup with an indicator and a removable lid attached in accordance with the present invention.

The system includes multiple storage devices to store freshly processed food in addition to the blender containers 20. For example, as shown in FIG. 12, a storage cup 40 with a freshness indicator 60 provides a storage option for foods processed by the blender portion of the system. The storage cup 40 can include one or more protruding elements 42, such as ridges or fin protrusions extending from the closed end of the storage cup 40 shown in FIG. 12. The protruding elements 42 also add a decorative element to the storage cup 40 and increase the stability of the storage cup 40 when it is placed on a surface, such as a table. The storage cup 40 can be made in different sizes to accommodate different uses and desired storage capabilities. The storage cups 40 can thereby be used to store various quantities of food portions. Each size of the storage cup 40 can have a respective removable lid 50. The storage cups 40 can also be used as drinking vessels if desired.

The storage cup 40 can include an indicator 60 to indicate the freshness of the food portion stored in the storage cup 40. In one embodiment shown in FIG. 12, the indicator 60 includes an indicator window 64 through which a reference indicium 66 is visible. In the depicted embodiment, the reference indicium 66 is a number that indicates the day of the month. For example, the "31" shown in FIG. 12 indicates the $31^{st}$ day of the month. The first through thirty-first days of a month can be printed about the outer perimeter of the storage cup 40. Rotating a rotatable element 62 attached with the storage cup 40 can change the reference indicium 66 such that the desired date or number is shown through the indicator window 64 on the rotatable element 62, while the remaining numbers are covered by the rotatable element 62. The reference indicium 66 can also indicate the number of days the food will remain fresh or the number of remaining days that the food will remain fresh. In another embodiment, the blender containers 20 can include indicators 60, each having a rotatable element 62, an indicator window 64, and a reference indicium 66 as described above. The indicators 60 of all embodiments can be adjustable and reusable and the reference indicium 66 need not be limited to numbers but may include a picture or word in alternative embodiments.

Figure 13:
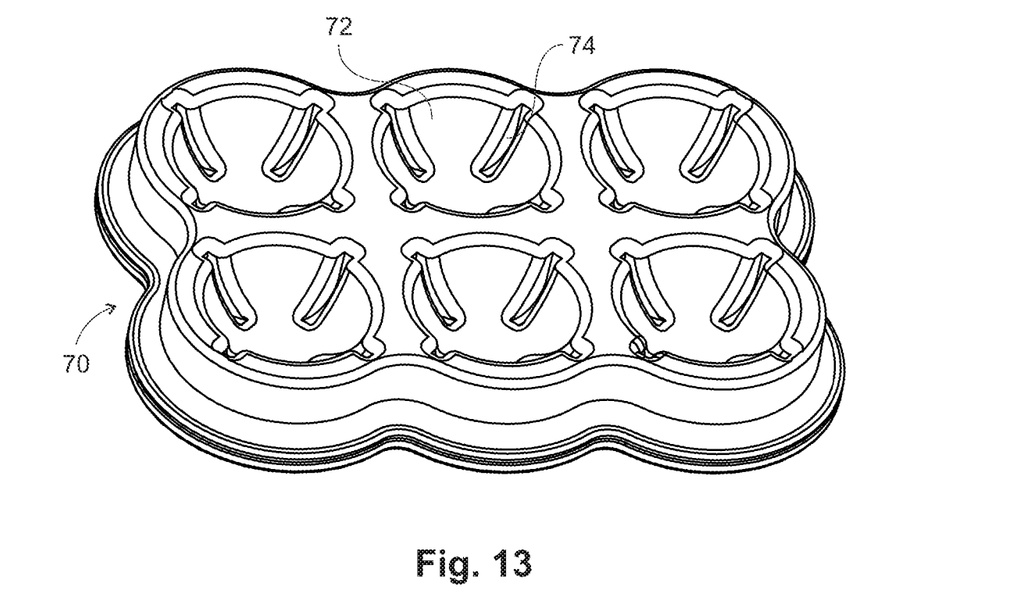
FIG. 13 is a perspective view of an embodiment of a cup storage tray in accordance with the present invention.

As illustrated in FIG. 13, the system can include a convenient tray 70 for storing multiple storage cups 40. The cup storage tray 70 can be made of plastic and includes one or more receptacles 72. Each receptacle 72 is shaped and dimensioned to accept a storage cup 40. The receptacle 72 can include one or more slots 74 to align with the protruding elements 42, such as the fin protrusions 42 shown in the figures, of the storage cup 40. In the depicted embodiment, the cup storage tray 70 can hold six storage cups 40. Also, the underside of the cup storage tray 70 is shaped and dimensioned to allow a cup storage tray 70 with storage cups 40 to be stacked on top of another cup storage tray 70 with storage cups 40. In such a configuration, the removable lid 50 of each storage cup 40 fits into a recess on the underside of the cup storage tray 70. In another embodiment, each receptacle 72 of the cup storage tray is adapted to receive a plurality of blender containers 20 in a similar manner as it receives the storage cups 40, described above.

Figure 14:
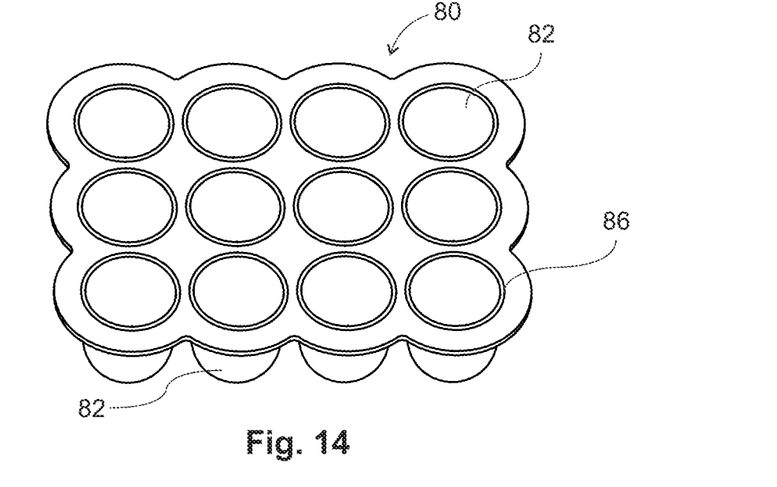
FIG. 14 is a perspective view of an embodiment of a food storage tray in accordance with the present invention.
Figure 15:
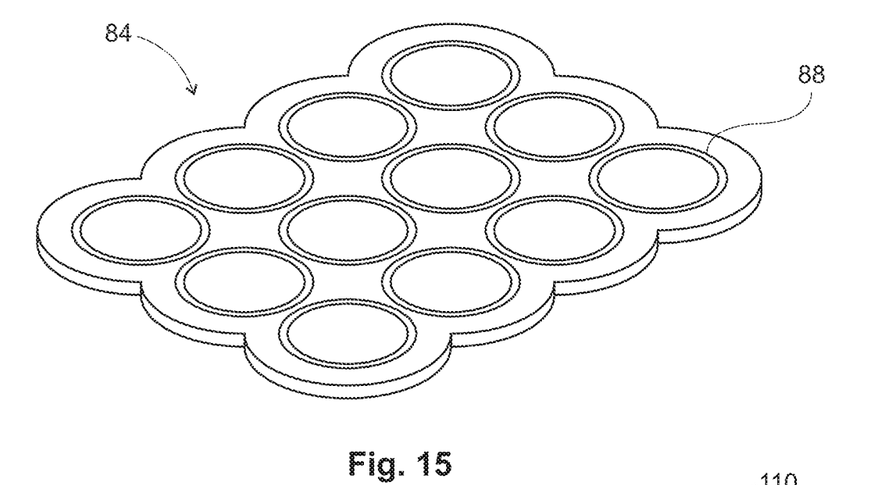
FIG. 15 is a perspective view of an embodiment of a food storage tray cover in accordance with the present invention.

A user can also transfer the freshly made food to a food storage tray, depicted in FIG. 14. The food storage tray 80 can be made from a flexible material and has one or more cavities 82. As shown in FIG. 15, a storage tray cover 84 can be provided, and is dimensioned to fit over the top of the food storage tray 80. In this way, when food is placed within the cavities 82 of the food storage tray 80, the food can be covered by placing the storage tray cover 84 over the food storage tray 80. The food storage tray 80 can also comprise a slightly raised lip 86 defining each cavity on the top side of the food storage tray. The storage tray cover 84 can have a plurality of complimentary recesses 88 formed in the bottom side of the cover 84 that fit over each lip 86. When the cover 84 is affixed to the tray 80, the lip 86 of each cavity 82 of the food storage tray 80 can fit within a respective recess 88 in the storage tray cover 84 to provide a sealed fit over each individual cavity 82 for improved preservation of the food.

Figure 16:
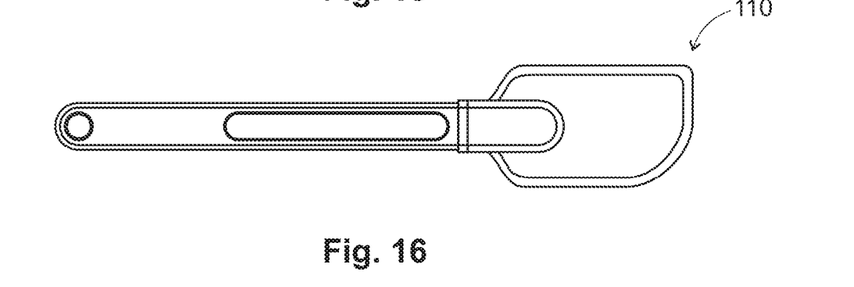
FIG. 16 is a perspective view of an embodiment of a spatula in accordance with the present invention.

A method of using the food processor system can involve processing food, such as ingredients for baby food, with the blender components of the system. After the food is processed, the food can be transferred to the storage cups 40 by using the spatula 110. The user can, for example adjust the indicator 60 by rotating a rotatable element 62 of the food storage cup 40 to set the reference indicium 66 before or after processing the food and transferring the food to the storage cups 40. The reference indicium 66 may represent the date the food was placed into the storage cup 40, the date in which food should be used by, or any other reminder freshness indicium 66 the user desires, including but not limited to the number of days in which the food will remain fresh or the number of days remaining in which the food will be fresh. Each storage cup 40 can be covered with a removable lid 50 before or after adjusting the indicator 60. Alternatively, the food can be transferred to the food storage tray 80, using the spatula 110 if desired, and covered with the storage tray cover 84. The spatula 110 can be specifically formed to remove processed food from the blender containers 20, food storage cups 40, and/or food storage tray 80. An example embodiment of a spatula 110 is shown in FIG. 16.

Once the processed food has been transferred to the desired storage containers, such as blender containers 20, storage cups 40, or food storage trays 80, the prepared food can be stored in the refrigerator or freezer. Thus, multiple portions of freshly processed food can be prepared with one use of the system and subsequently saved among multiple storage devices. The user may use the individual servings as needed, without wasting any of the freshly made food.

The blender containers 20, removable blade adapter 30, storage cups 40, and food storage trays 80 can be made of BPA-free material and dishwasher-safe. For example, the blender containers 20, storage cups 40, and respective removable lids 50 can be made of BPA-free plastics or another suitable material. The food storage tray 80 and storage tray cover 84 can be made of BPA-free plastic, silicone, or other suitable material. When the food storage tray 80 is comprised of silicone, the cavities 82 are flexible so they can pop up from the tray 80 to allow easier remove the desired amount of food from the tray 80. Accordingly, one can easily remove, or pop out, food portions that have been frozen in the food storage tray 80, and the tray 80 can be reused.

The method can yield multiple pre-planned portions of food servings. As a non-limiting example, each storage cup 40 and food storage tray's cavity 82 can be made to hold a two-ounce serving of freshly made baby food. Using an appropriately sized blender container, a user can make several portions of a baby food at one time. In addition, the user can add a desired amount of liquid such as water to achieve a desired consistency of the baby food.

The following table provides non-limiting examples of produce that can yield certain, approximate numbers of baby food portions such that a user can plan a menu prior to performing the remaining steps of the method described herein. Certain foods may require pre-cooking prior to performing the method.

| Produce | Yield of Two-Ounce Servings |
| --- | --- |
| 1 cup cantaloupe | 3 |
| 1 cup watermelon | 3 |
| 1 cup pineapple | 3 |
| 1 cup apricots | 3 |
| 1 cup kale | 3 |
| 2 plums | 3.5 |
| 1 avocado | 4 |
| 1 banana | 4 |
| 1 cup peas | 4 |
| 1 pear | 4 |
| 20 spears of asparagus | 4 |
| 1 carrot | 4 |
| ⅓ head of cauliflower | 4 |
| 1 turnip | 4 |
| 1 peach | 5 |
| 1 cup green beans | 5 |
| 1 apple | 6 |
| ⅓ head of broccoli | 6 |
| ½ an eggplant | 6 |
| 1 turnip | 4 |
| 1 white potato | 8 |
| 1 zucchini | 10 |
| 1 squash | 10 |
| 1 cup of milled oatmeal cereal | 10 |
| 1 cup of milled millet cereal | 10 |
| 1 cup brown rice cereal | 16 |

Utilizing this system and method, one can create a week's worth of baby food or more in less than five minutes. In addition, a user can pre-plan the amount of food he or she will make. One can also create a feeding schedule for a baby approximately four months and older, utilizing foods that are appropriate for the baby's age. This invention may be industrially applied to the development, manufacture, and use of food processors, particularly devices for producing baby food. While the present invention has been described with regards to particular embodiments, it is recognized that additional variations of the present invention may be devised without departing from the inventive concept. A person skilled in the art would appreciate that exemplary embodiments described hereinabove are merely illustrative of the general principles of the present invention. Other components, configurations, modifications or variations may be employed that are within the scope of the invention. Accordingly, the drawings and description are illustrative and not meant to be a limitation thereof.

All terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. The term "adapted to" is drawn to a capability. Thus, it is intended that the invention cover all embodiments and variations thereof as long as such embodiments and variations come within the scope of the appended claims and their equivalents.

What is claimed is:
1. A system for enhancing preparation and storage of freshly homemade baby food comprising:
a blender base,
a blender container having a removable blade adapter, said removable blade adapter having a blade member, said blender container and said removable blade adapter are capable of operatively engaging with said blender base to thereby process food with said blade member when engaged;

at least one storage cup with an open end and a closed end capable of receiving said processed food, said storage cup having at least three ridges protruding outward from the closed end of the cup and positioned so that the cup may rest stably on a flat surface, said storage cup also having a removable lid and an indicator on the open end, said indicator comprising an irremovable rotatable element attached to the storage cup and separate from the removable lid and an indicator window through which a reference indicium is visible; and a cup storage tray having at least one receptacle, said at least one receptacle having a matching number of slots as to the number of ridges of the storage cup, said slots positioned to be aligned with said at least three ridges of said storage cup, said slots further having dimensions and shaped to conform to said ridges, so that said at least one receptacle stably holds said at least one storage cup in said storage tray.

2. The system of claim 1, further comprising a food storage tray having at least one cavity capable of receiving said processed food, and a storage tray cover adapted to cover said food storage tray.

3. The system of claim 1, said blender container comprises one open end and one closed end, wherein said open end is adapted to interchangeably connect to said removable blade adapter and a removable lid.

4. The system of claim 3, further comprising a sipper top adapted to connect to said open end of said blender container or an open end of said storage cup.

5. The system of claim 3, said blender container further comprising at least one protruding element.

6. The system of claim 3, said one open end of said blender container further comprises at least one locking member capable of maintaining the blender container and blender base in an operatively engaged state and a lip extending around the perimeter of said blender container capable of preventing spills on said blender base.

7. The system of claim 1, said blender container comprises two open ends, a first open end adapted to connect to said blade adapter and a second open end adapted to connect to a removable lid member.

8. The system of claim 7, said second open end of said blender container further comprises at least one locking member capable of maintaining the blender container and blender base in an operatively engaged state and a lip extending around the perimeter of said blender container capable of preventing spills on said blender base.

9. The system of claim 1, said blender container further comprises at least one handle.

10. The system of claim 1, said at least one storage cup further comprises at least one handle.

11. The system of claim 1, further comprising a spatula.

12. A system for enhancing preparation and storage of freshly homemade baby food comprising:

a blender base, a blender container having a removable blade adapter, said removable blade adapter having a blade member, said blender container and said removable blade adapter are capable of operatively engaging with said blender base to thereby process food with said blade member when engaged; said blender container further comprises at least one locking member capable of maintaining the blender container and blender base in an operatively engaged state and a lip extending around the perimeter of said blender container capable of preventing spills on said blender base; at least one storage cup with an open end and a closed end capable of receiving said processed food, said storage cup having at least three ridges protruding outward from the closed end of the cup positioned so that the cup may rest stably on a flat surface, a removable lid and an indicator on the open end, said indicator comprising an irremovable rotatable element attached to the storage cup and separate from the removable lid and an indicator window through which a reference indicium is visible;

a cup storage tray having at least one receptacle, said at least one receptacle having a matching number of slots as to the number of ridges of the storage cup, said slots positioned to be aligned with said at least three ridges of said storage cup, said slots further having dimensions and shaped to conform to said ridges, so that said at least one receptacle stably holds said at least one storage cup in said storage tray; and a food storage tray having at least one receptacle capable of receiving said processed food comprised of a at least one raised lip defining each cavity on the top side of the food storage tray, and a storage tray cover adapted to cover said food storage tray comprised of at least one complimentary recess formed in the bottom side of said food storage tray cover that fits over said at least one lip of said food storage tray;

whereby a user can process and store multiple portions of baby food with one use of the system.

* * * * *